United States Patent [19]
Aiken et al.

[11] Patent Number: 6,003,238
[45] Date of Patent: Dec. 21, 1999

[54] METHOD FOR FACILITATING THE INSTALLATION OF AN AXIALLY ADJUSTABLE DRIVESHAFT ASSEMBLY IN A VEHICLE

[75] Inventors: Albert Aiken; Jeffrey A. Dutkiewicz; David W. Maxwell, all of Toledo, Ohio

[73] Assignee: Dana Corporation, Toledo, Ohio

[21] Appl. No.: 08/866,021

[22] Filed: May 30, 1997

[51] Int. Cl.[6] ..................................................... G01B 5/14
[52] U.S. Cl. ................................. 33/600; 33/603; 33/605; 33/613
[58] Field of Search .............................. 33/600, 603, 605, 33/606, 613, 633, 645

[56] References Cited

U.S. PATENT DOCUMENTS

| | | | |
|---|---|---|---|
| 234,485 | 10/1880 | Lavance | 33/613 |
| 695,661 | 3/1902 | Theibault | 33/810 |
| 698,554 | 4/1902 | Reynolds . | |
| 707,723 | 9/1902 | Robbins | 33/806 |
| 2,686,959 | 8/1954 | Robinson | 33/613 |
| 2,824,379 | 2/1958 | Katz | 33/613 |
| 2,900,734 | 8/1959 | Richards . | |
| 3,939,898 | 2/1976 | Petro et al. . | |
| 4,064,632 | 12/1977 | Waldecker . | |
| 4,534,200 | 8/1985 | Celette | 33/600 |
| 4,930,221 | 6/1990 | Taylor . | |
| 5,131,164 | 7/1992 | Miller | 33/613 |
| 5,185,937 | 2/1993 | Piety et al. . | |
| 5,390,422 | 2/1995 | Hill . | |
| 5,465,498 | 11/1995 | Lycan | 33/533 |
| 5,538,474 | 7/1996 | Kretschmer et al. | 464/162 |
| 5,647,139 | 7/1997 | Richardson | 33/533 |
| 5,657,545 | 8/1997 | Haworth et al. | 33/600 |
| 5,797,800 | 8/1998 | Rhoades et al. | 464/13 |

FOREIGN PATENT DOCUMENTS

| | | | |
|---|---|---|---|
| 2602044 | 1/1988 | France | 33/810 |
| 1620800 | 1/1991 | U.S.S.R. | 33/806 |

*Primary Examiner*—Diego Gutierrez
*Assistant Examiner*—Maria Fernandez
*Attorney, Agent, or Firm*—McMillan, Sobanski & Todd, LLC

[57] ABSTRACT

A method for pre-positioning the driveshaft sections of an axially adjustable driveshaft assembly prior to installation within a vehicle to facilitate the installation process. An installation tool is provided with first and second members which are movable relative to one another. Reference indicia are provided on one or both of the members such that mounting surfaces provided thereon can be spaced apart from one another by a predetermined amount. The mounting surfaces of the installation tool are mounted on separate sections of the driveshaft assembly. Then, the driveshaft sections are moved relative to one another until the reference indicia provided on the installation tool are properly aligned. When such alignment is achieved, the overall axial length of the driveshaft assembly is approximately equal to the desired length between the engine/transmission assembly and the axle assembly. Then, the installation tool is removed, and the driveshaft assembly is installed in the vehicle. Because the overall axial length of the driveshaft assembly has been pre-positioned to the desired length, little or no adjustment thereof will be required to install the driveshaft assembly within the vehicle.

11 Claims, 4 Drawing Sheets

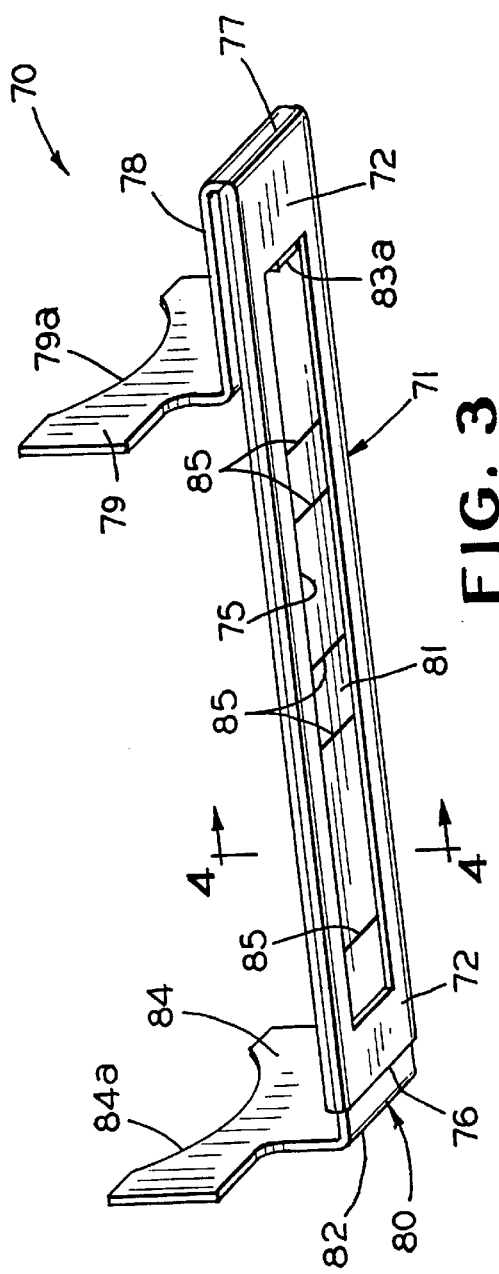
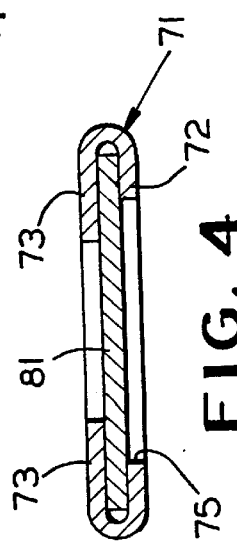
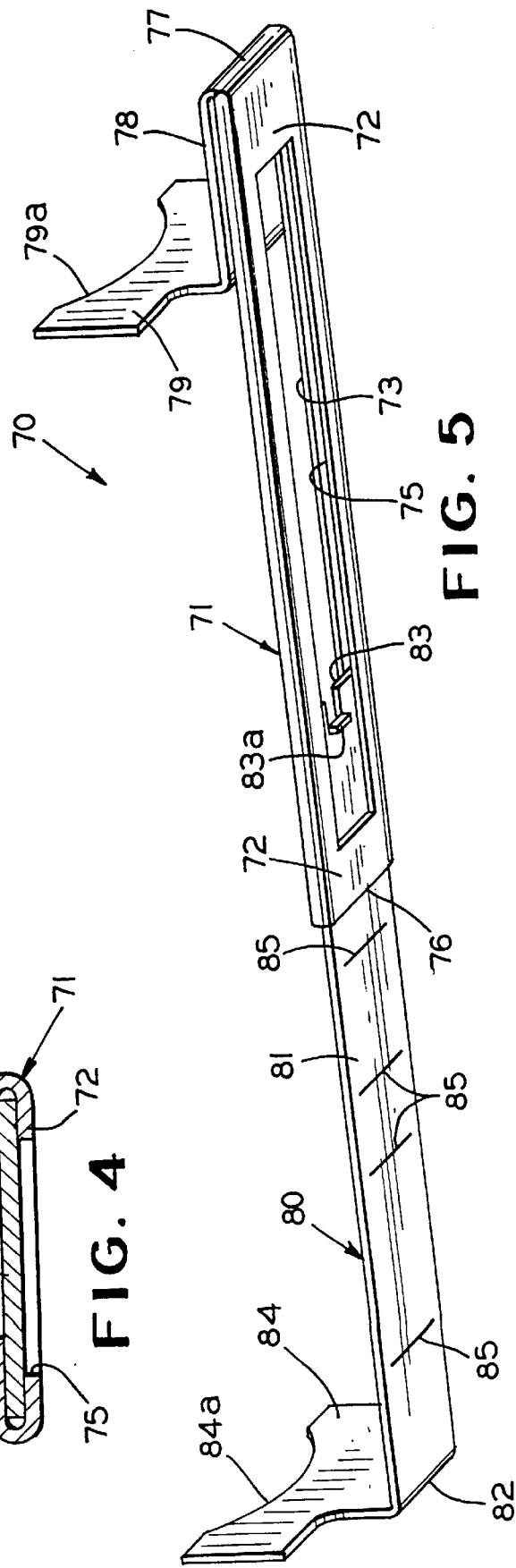
FIG. 3
FIG. 4
FIG. 5

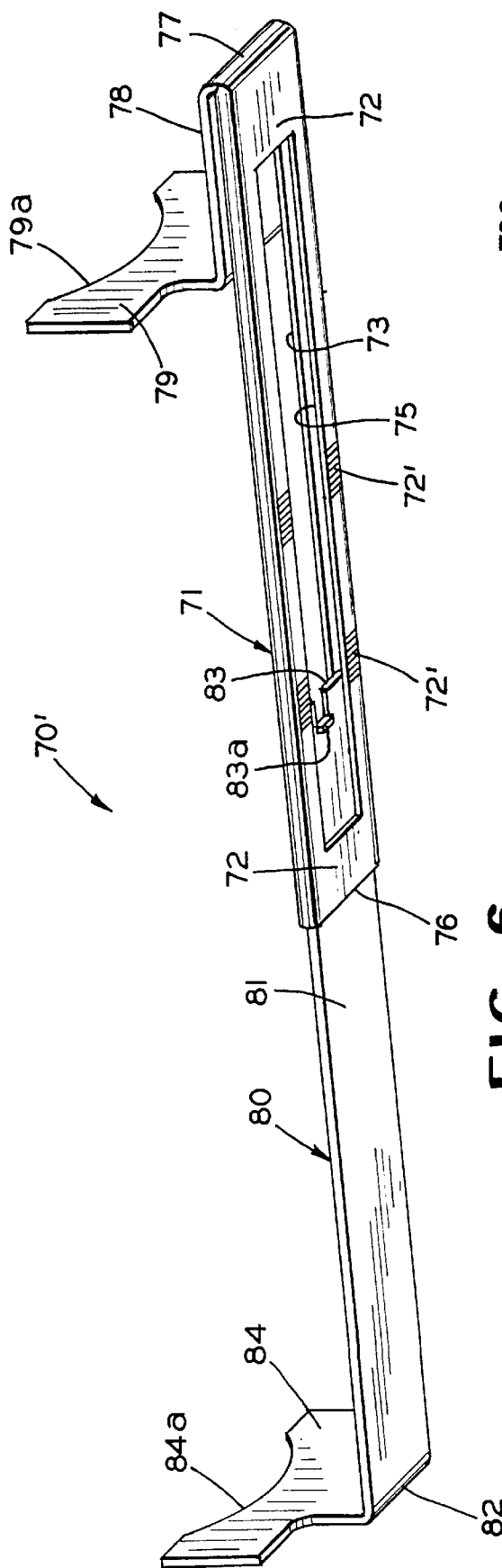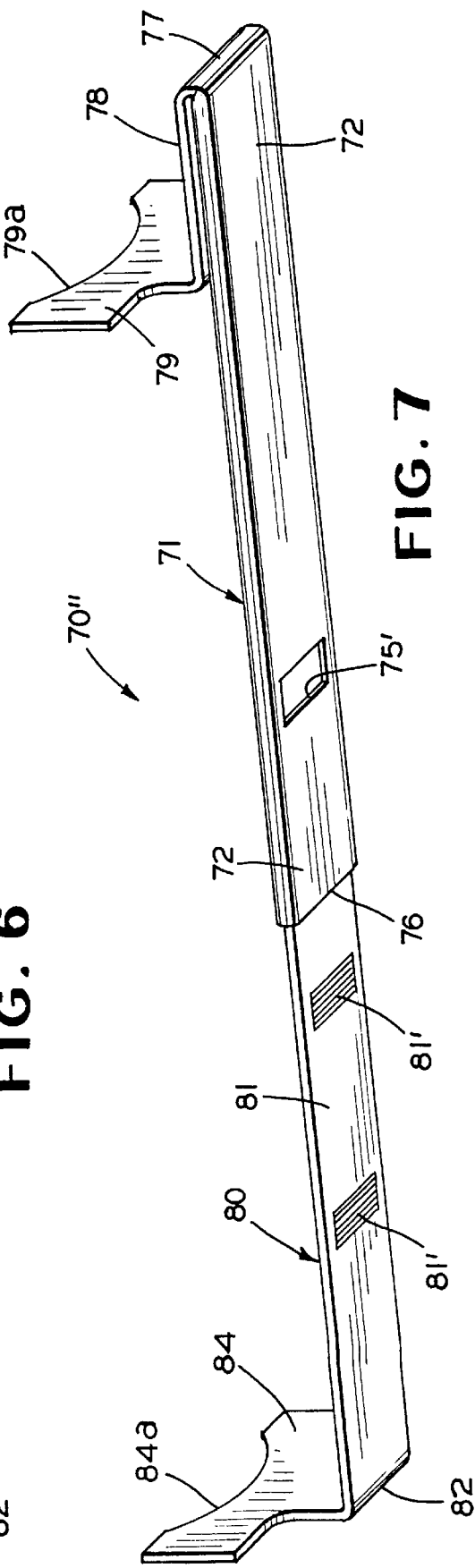

METHOD FOR FACILITATING THE INSTALLATION OF AN AXIALLY ADJUSTABLE DRIVESHAFT ASSEMBLY IN A VEHICLE

BACKGROUND OF THE INVENTION

This invention relates in general to a method for installing a driveshaft assembly within a vehicle so as to transfer rotational power from an engine to an axle assembly. In particular, this invention relates to a method for pre-positioning the components of an axially adjustable driveshaft assembly prior to installation within such a vehicle to facilitate the installation process.

In most land vehicles in use today, a driveshaft assembly is provided for transmitting rotational power from an output shaft of an engine/transmission assembly to an input shaft of an axle assembly so as to rotatably drive one or more wheels of the vehicle. A basic vehicular driveshaft assembly includes a hollow cylindrical driveshaft tube and a pair of universal joints. A first one of the universal joints is connected between the output shaft of the engine/transmission assembly and a first end of the driveshaft tube, while a second one of the universal joints is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

In some instances, the driveshaft assembly must also accommodate a limited amount of relative axial movement between the engine/transmission assembly and the axle assembly. To accomplish this, it is known to divide the driveshaft tube into two separate driveshaft sections and provide an axially adjustable connection therebetween. Typically, the axially adjustable connection is embodied as mating male and female splined members provided on the two driveshaft sections. The male and female splined members cooperate to provide a rotational driving connection between the engine/transmission assembly and the axle assembly, while allowing a limited amount of relative axial movement therebetween. The splined connection between the two driveshaft sections is typically covered by an exterior seal, such as a flexible convoluted boot, which extends thereabout to prevent the entry of dirt, water, and other contamination. The splined connection may also have an interior sealing structure, such as a plug, for preventing contaminants from entering through the hollow yokes or driveshaft sections into the region of the splined members.

Typically, the driveshaft assembly is manufactured in one location, then shipped to another location for assembly into the vehicle. During assembly into the vehicle, the driveshaft assembly is initially positioned within the vehicle. Then, the ends of the driveshaft assembly are secured to the engine/transmission assembly and the axle assembly. When the driveshaft assembly being installed is axially adjustable, it is necessary to extend or retract the two driveshaft sections such that the overall length of the driveshaft assembly is approximately equal to the length between the engine/transmission assembly and the axle assembly. This extension and retraction of the driveshaft assembly is usually performed manually. In the past, the installer initially positioned the driveshaft assembly within the vehicle, then manually extended or retracted the components thereof to the desired length. It has been found that this manual extension and retraction is awkward to perform when the driveshaft assembly has been positioned within the vehicle. Furthermore, because of close manufacturing tolerances, a vacuum effect may render the manual extension and retraction of the driveshaft sections even more difficult when the driveshaft assembly is positioned within the vehicle. Inasmuch as the splined connection between the two driveshaft sections is covered by the flexible boot as described above, it has not been feasible to pre-adjust the overall length of the driveshaft assembly prior to installation within the vehicle. Thus, it would be desirable to provide a method for pre-positioning the driveshaft sections of an axially adjustable driveshaft assembly prior to installation within such a vehicle to facilitate the installation process.

SUMMARY OF THE INVENTION

This invention relates to a method for pre-positioning the driveshaft sections of an axially adjustable driveshaft assembly prior to installation within a vehicle to facilitate the installation process. An installation tool is provided with first and second members which are movable relative to one another. Reference indicia are provided on one or both of the members such that mounting surfaces provided thereon can be spaced apart from one another by a predetermined amount. The mounting surfaces of the installation tool are mounted on separate sections of the driveshaft assembly. Then, the driveshaft sections are moved relative to one another until the reference indicia provided on the installation tool are properly aligned. When such alignment is achieved, the overall axial length of the driveshaft assembly is approximately equal to the desired length between the engine/transmission assembly and the axle assembly. Then, the installation tool is removed, and the driveshaft assembly is installed in the vehicle. Because the overall axial length of the driveshaft assembly has been pre-positioned to the desired length, little or no adjustment thereof will be required to install the driveshaft assembly within the vehicle.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is a perspective view of a first embodiment of the installation tool illustrated in FIG. 2 shown in a retracted position.

FIG. 4 is a sectional elevational view of the first embodiment of the installation tool taken along lines 4—4 of FIG. 3.

FIG. 5 is a perspective view of the first embodiment of the installation tool illustrated in FIG. 2 shown in an extended position.

FIG. 6 is a perspective view of a second embodiment of the installation tool illustrated in FIG. 2 shown in an extended position.

FIG. 7 is a perspective view of a third embodiment of the installation tool illustrated in FIG. 2 shown in an extended position.

DETAILED DESCRIPTION OF THE PREFERRED EMBODIMENTS

Figure 1:
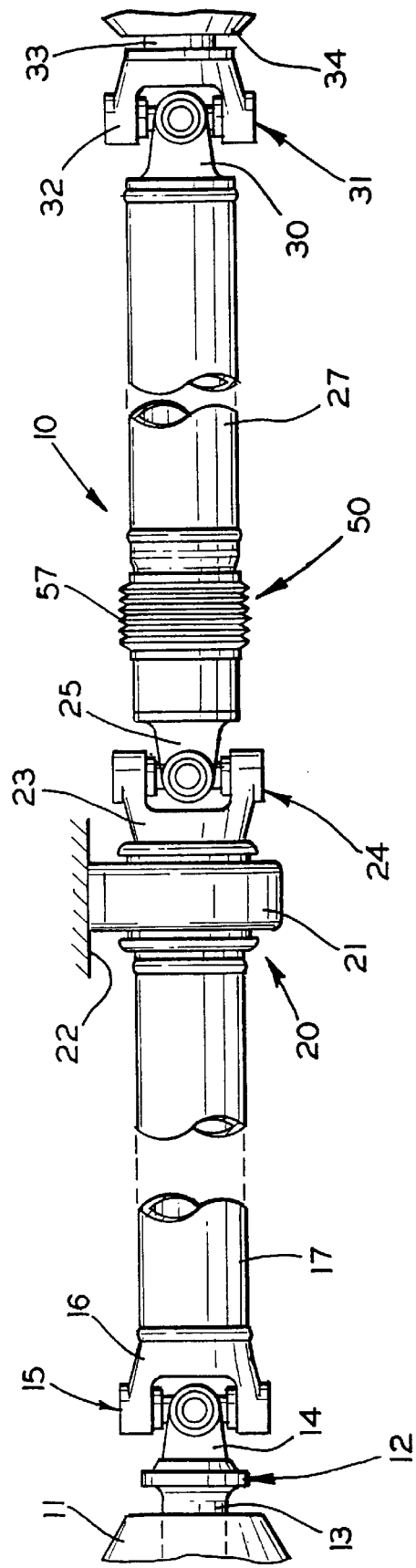
FIG. 1 is a side elevational view of vehicle drive train including an axially adjusted driveshaft assembly shown mounted on a vehicle.

Referring now to the drawings, there is illustrated in FIG. 1 a vehicular drive train including a driveshaft assembly, indicated generally at 10, for transmitting rotational power from an engine/transmission assembly 11 to a plurality of driven wheels (not shown). The engine/transmission assembly 11 is conventional in the art and includes an externally splined output shaft (not shown) which is connected to a first slip yoke assembly, indicated generally at 12. The first slip yoke assembly 12 is conventional in the art and includes an internally splined tubular end portion 13 which slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative thereto to a limited extent. The first slip yoke assembly 12 further includes a yoke 14, which forms one part of a first universal joint assembly, indicated generally at 15. The first universal joint assembly 15 is also conventional in the art and includes a tube yoke 16 which is connected to the yoke 14 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of axial misalignment therebetween. Alternatively, the output shaft of the engine/transmission assembly 11 may terminate in a conventional end yoke (not shown) which is directly connected to the cross of the first universal joint assembly 15.

The first driveshaft section 17 extends through and is supported for rotation by a center bearing assembly, indicated generally at 20. The center bearing assembly 20 is conventional in the art and includes a rigid frame or bracket 21 which is secured to a portion of a frame, chassis, or body 22 of the vehicle. The first driveshaft section 17 terminates in a second end including an end yoke 23, which forms one part of a second universal joint assembly, indicated generally at 24. The second universal joint assembly 24 is also conventional in the art and includes a yoke shaft 25 which is connected to the end yoke 23 by a cross 26 (see FIG. 2) in a known manner. The yoke shaft 25 is, in turn, connected through a second slip yoke assembly, indicated generally at 50, to a first end of a second driveshaft section 27. The second universal joint assembly 24 thus provides a rotational driving connection between the first driveshaft section 17 and the second driveshaft section 27, while permitting a limited amount of axial misalignment therebetween. The structure and operation of the second slip yoke assembly 50 will be described in detail below.

The second driveshaft section 27 terminates in a second end having a tube yoke 30 secured thereto. The tube yoke 30 forms one part of a third universal joint assembly 31. The third universal joint assembly 31 is also conventional in the art and includes a tube yoke 32 which is connected to an input shaft 33 of an axle assembly 34 by a cross in a conventional manner. The third universal joint assembly 31 thus provides a rotational driving connection between the second driveshaft section 27 and the input shaft 33 of the axle assembly 34, while permitting a limited amount of axial misalignment therebetween. The axle assembly 34 is conventional in the art and is adapted to transmit rotational power from the input shaft 33 to the driven wheels of the vehicle in a known manner.

Figure 2:
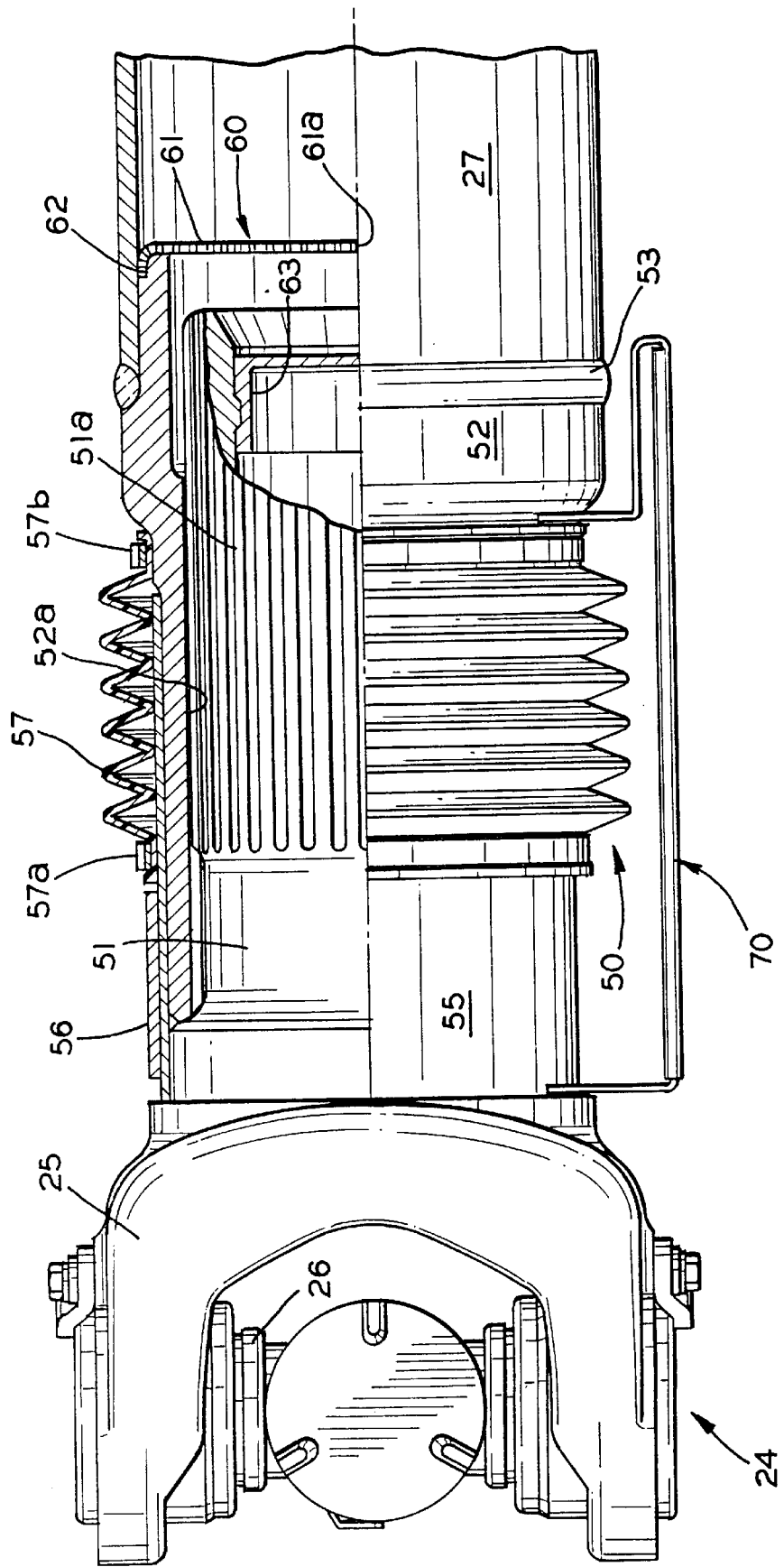
FIG. 2 is an enlarged top plan view, partially in cross section, of a portion of the driveshaft assembly illustrated in FIG. 1 including a tool for facilitating the installation thereof within the vehicle accordance with this invention.

Referring now to FIG. 2, the structure of the second slip yoke assembly 50 is illustrated in detail. As shown therein, the yoke shaft 25 includes a cylindrical shaft portion 51 having a plurality of splines 51a formed on the outer surface thereof. A hollow cylindrical transition member 52 is disposed co-axially about the shaft portion 51 of the yoke shaft 25. The transition member 52 has a plurality of splines 52a formed on an inner surface thereof which cooperate with the external splines 51a formed on the shaft portion 51 of the yoke shaft 25. As a result, the yoke shaft 25 is connected to the transition member 52 for rotational driving movement, yet is permitted to move axially relative thereto. The transition member 52 is secured to the second driveshaft section 27, such as by a weldment 53, for rotational movement therewith.

A hollow cylindrical weld ring 55 is secured to the yoke shaft 25 for rotational movement therewith. As shown in FIG. 2, the weld ring 55 may be secured to the yoke shaft 25 by press fitting it on a shoulder provided on the yoke shaft 25. However, the weld ring 55 may be secured to the yoke shaft 25 in any other desired manner. The weld ring 55 extends co-axially about the splined connection between the transition member 52 and the shaft portion 51 of the yoke shaft 25. The weld ring 55 provides an exterior surface to which one or more balance weights 56 may be secured to rotationally balance the slip yoke assembly during use. The weld ring 55 also functions to define a relatively small annular space about the transition member 52, for a purpose which will be explained below.

A flexible convoluted boot 57 is provided as an exterior seal structure to seal the splined connection between the transition member 52 and the shaft portion 51 of the yoke shaft 25. As shown in FIG. 2, a first end of the flexible boot 57 is secured to the weld ring 55, such as by a conventional band clamp 57a. Similarly, a second end of the flexible boot 57 is secured to the transition member 52, such as by a conventional band clamp 57b. The boot 57 prevents dirt, water, and other contaminants from entering into the splined connection between the transition member 52 and the shaft portion 51 of the yoke shaft 25. During use, the yoke shaft 25 may move axially relative to the second driveshaft section 27. When such relative axial movement occurs, the boot 57 will expand and retract axially to accommodate such movement, while continuing to provide the desired sealing action.

As mentioned above, the weld ring 55 defines a relatively small annular space about the transition member 52. Typically, a quantity of lubricant is injected into the region of the splined connection between the transition member 52 and the shaft portion 51 of the yoke shaft 25 to facilitate relative axial movement. Any lubricant which escapes from the region of the splined connection will be trapped in the annular space defined between the weld ring 55 and the transition member 52. The retention of lubricant in this annular space is desirable because it reduces the amount of lubricant which would otherwise move into the region of the flexible boot 57. The accumulation of lubricant in the region of the flexible boot 57 is undesirable because it can cause ballooning of the flexible boot 57 when rotated at high speeds.

A sleeve cup, indicated generally at 60, is provided as an interior seal structure to seal the splined connection between the transition member 52 and the shaft portion 51 of the yoke shaft 25. As shown in FIG. 2, the sleeve cup 60 includes a circular body portion 61 having a relatively short, axially extending flange portion 62. The circular body portion 61 of the sleeve cup 60 extends over the open end of the transition member 52, thereby preventing dirt, water, and other contaminants from entering into the splined connection between the transition member 52 and the shaft portion 51 of the yoke shaft 25 through the interior of the second driveshaft section 27. A central opening 61a may be formed through the circular body portion 61 of the sleeve cup 60. The central opening 61a functions as a vent to prevent trapped air within the region of the splined connection between the transition member 52 and the shaft portion 51 of the yoke shaft 25 from causing ballooning of the flexible boot 57 when relative axial movement occurs.

The flange portion 62 of the sleeve cup 60 is retained within the slip yoke assembly 10 by frictional engagement between the inner cylindrical surface of the second driveshaft section 27 and the outer cylindrical surface of the transition member 52. The sleeve cup 60 can be installed by initially disposing it about the end of the transition member 52, then moving the second driveshaft section 27 axially thereabout. Once the second driveshaft section 27 is secured to the transition member 52, the sleeve cup 60 will be permanently retained thereon. In this manner, the sleeve cup 60 can be quickly and easily installed without the use of special tools or other mounting structures.

A plug 63 is also provided as an interior seal structure to seal the splined connection between the transition member 52 and the shaft portion 51 of the yoke shaft 25. As shown in FIG. 2, the plug 63 is conventional in the art and is generally cup-shaped. The plug 63 is press fit into the open end of the shaft portion 51 of the yoke shaft 25 to prevent dirt, water, and other contaminants from entering into the splined connection between the transition member 52 and the shaft portion 51 of the yoke shaft 25 through the interior of the yoke shaft 25. The structure of the slip yoke assembly 50 is conventional in the art and is intended to represent any axially adjustable connection between the first and second driveshaft sections 17 and 27.

An installation tool, indicated generally at 70, in accordance with this invention is shown on the second slip yoke assembly 50 in FIG. 2. As will be explained in detail below, the installation tool 70 IS used to facilitate the installation of the driveshaft assembly 10 within the vehicle. Referring now to FIGS. 3 through 5, the structure of a first embodiment of the installation tool 70 is illustrated in detail. As shown therein, the installation tool 70 includes a first member 71 that is preferably formed from a rigid material, such as metal. The first member 71 includes a flat elongated bottom portion 72 having side portions 73 (see FIG. 4) which are folded thereover, defining a pair of elongated interior regions. An enlarged rectangular opening 75 is formed through the bottom portion 72 of the first member 71. The bottom portion 72 extends from a first end 76 to a second end 77. As shown in FIGS. 3 and 5, the second end 77 is defined by a curved region of the bottom portion 72 which extends upwardly to a flat extension portion 78. The extension portion 78 extends back over the adjacent portions of the bottom portion 72 and the side portions 73 of the first member 71. The extension portion 78 terminates in an upwardly extending yoke portion 79 having a concavely curved mounting surface 79a formed therein.

The installation tool 70 further includes a second member 80 that is also preferably formed from a rigid material, such as metal. The second member 80 includes a flat elongated portion 81 that is received in the elongated interior regions defined between the elongated bottom portion 72 and the elongated upper side portions 73 of the first member 71. Thus, the second member 80 is captured between the bottom portion 72 and the side portions 73 of the first member 71 for axial sliding movement relative thereto between a retracted position (illustrated in FIG. 3) and an extended position (illustrated in FIG. 5). The flat elongated portion 81 of the second member 80 extends from a first end 82 to a second end 83. The first end 82 of the second member 80 is defined by a yoke portion 84 which extends upwardly from the flat elongated portion 81 and has a concavely curved mounting surface 84a formed therein. The second end 83 of the second member 81 is defined by a tab 83a which is cut from the end of the flat elongated portion 81. The tab 83a is bent downwardly so as to extend at least partially through the enlarged rectangular opening 75 formed through the flat bottom portion 72 of the first member 71. Thus, the amount of axial sliding movement of the second member 80 relative to the first member 71 is limited by the engagement of the tab 83a with the opposed ends of the enlarged rectangular opening 75. In this manner, the second member 80 is positively retained within the first member 71.

A plurality of spaced apart lines 85 or other indicia is provided on the bottom surface of the flat elongated portion 81 of the second member 80. The lines 85 represent predetermined axial lengths which, as will be described in detail below, are selected to facilitate the installation of the driveshaft assembly 10 within the vehicle. These lengths may be calibrated in absolute terms (i.e., in inches, millimeters, and the like) or in relative terms (A for a first driveshaft assembly length or model, B for a second driveshaft assembly length or model, and the like). The lines 85 of the second member 80 may positioned relative to any reference location provided on the first member 71. For example, the lines 85 of the second member 80 may be positioned relative to the first end 76 of the first member 71. Alternatively, the lines 85 of the second member 80 may be positioned relative to the inner end of the rectangular opening 75 formed through the first member 71 or relative to a reference mark (not shown) provided on the bottom surface of the bottom portion 72 of the first member 71. Regardless of the specific means by which the second member 80 is axially positioned relative to the first member 71, the result of such positioning is that the two yoke portions 79 and 84 can be positioned a predetermined distance apart from one another.

Referring back to FIG. 1, the method by which the installation tool 70 can be used to install the driveshaft assembly 10 on the vehicle will be described. As mentioned above, the driveshaft assembly 10 is typically manufactured in one location, then shipped to another location for assembly into a vehicle. Under the conventional method of assembly, the driveshaft assembly 10 is initially positioned within the vehicle. It is often necessary to then extend or retract the first and second driveshaft sections 17 and 27, respectively such that the overall length of the driveshaft assembly 10 is approximately equal to the desired length between the engine/transmission assembly 11 and the axle assembly 34. Thereafter, the first and third universal joints 15 and 31 are secured to the engine/transmission assembly 11 and the axle assembly 34, respectively.

To facilitate the installation of the driveshaft assembly 10, the installation tool 70 of this invention is provided to allow the first and second driveshaft sections 17 and 27, respectively to be extended or retracted to the desired length between the engine/transmission assembly 11 and the axle assembly 34 prior to installation of the driveshaft assembly 10 within the vehicle. To accomplish this, the installation tool 70 is initially installed on the slip yoke assembly 50 as shown in FIG. 2 before the driveshaft assembly 10 is positioned within the vehicle. As shown therein, this can be accomplished by positioning the concavely curved mounting surface 79a of the yoke portion 79 of the first member 71 at a recessed area defined by portions of the transition member 52 and the end of the flexible boot 57. However, it will be appreciated that the concavely curved mounting surface 79a of the yoke portion 79 of the first member 71 can be positioned at any other area of the driveshaft assembly 10 which is fixed in relation to the second driveshaft section 27. Similarly, the concavely curved mounting surface 84a of the yoke portion 84 of the second member 80 is positioned at a shoulder defined by the end of the yoke shaft 25 and the weld ring 55. It will also be appreciated that the concavely curved mounting surface 84a of the yoke portion 84 of the second member 80 can be positioned at any other area of the driveshaft assembly 10 which is fixed in relation to the first driveshaft section 17.

After installing the installation tool 70 on the slip yoke assembly 50 in this manner, the second driveshaft section 27 is manually moved axially relative to the first driveshaft section 17 until the desired one of the plurality of spaced apart lines 85 provided on the second member 80 is aligned with the reference location or mark provided on the first member 71. When such alignment is achieved, the overall axial length of the driveshaft assembly 10 is approximately equal to the desired length between the engine/transmission assembly 11 and the axle assembly 34. Then, the installation tool 70 is removed, and the driveshaft assembly 10 is installed in the vehicle. Because the overall axial length of the driveshaft assembly 10 has been pre-positioned to the desired length, little or no adjustment thereof will be required to install the driveshaft assembly 10 within the vehicle.

Referring now to FIG. 6, there is illustrated a second embodiment of an installation tool, indicated generally at 70', in accordance with this invention. The installation tool 70' is generally similar to the installation tool 70 described above, and like reference numbers have been used to indicated similar components. The installation tool 70' of FIG. 6 is not provided with the plurality of spaced apart lines 85 on the second member 80. Rather, the bottom surface of the bottom portion 72 of the first member 71 has one or more reference marks 72' provided thereon. The reference marks 72' may be formed integrally with the bottom portion 72 of the first member 71 or may simply be marked thereon, such as by colored paint. The installation tool 70' is used by aligning the second end 83 of the second member 80 with a desired one of the reference marks 72' provided on the bottom portion of the first member 71. The use of the installation tool 70' is otherwise identical to that described above.

Referring now to FIG. 7, there is illustrated a third embodiment of an installation tool, indicated generally at 70", in accordance with this invention. The installation tool 70" is generally similar to the installation tool 70 described above, and like reference numbers have been used to indicated similar components. The installation tool 70" of FIG. 7 is not provided with the enlarged rectangular opening 75 formed through the bottom portion 72 of the first member 71. Rather, the bottom portion 72 of the first member 71 has a relatively small rectangular opening 75' formed therethrough. Also, the installation tool 70" of FIG. 7 is not provided with the plurality of spaced apart lines 85 on the second member 80. Rather, the bottom surface of the flat elongated portion 81 of the second member 80 has one or more reference marks 81' provided thereon. The reference marks 81' may be formed integrally with the bottom surface of the flat elongated portion 81 of the second member 80 or may simply be marked thereon, such as by colored paint.

The installation tool 70" is used by aligning the a selected one of the reference marks 81' within the rectangular opening 75' formed through the bottom portion 72 of the first member 71. The use of the installation tool 70" is otherwise identical to that described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for installing an axially adjustable driveshaft assembly within a vehicle comprising the steps of:

(a) providing an installation tool including relatively movable first and second members having respective mounting surfaces;

(b) mounting the mounting surfaces of the installation tool on first and second sections of the driveshaft assembly;

(c) moving the first and second driveshaft sections relative to one another until the mounting surfaces of the installation tool are located a predetermined distance from one another;

(d) removing the installation tool from the driveshaft assembly; and (e) installing the driveshaft assembly within the vehicle without further movement of the first and second driveshaft sections relative to one another.

2. The method defined in claim 1 wherein said step (a) further includes providing an installation tool having reference indicia provided on one of the first and second members.

3. The method defined in claim 2 wherein the reference indicia includes a line formed on one of the first and second members.

4. The method defined in claim 2 wherein the reference indicia includes an opening formed through one of the first and second members.

5. The method defined in claim 1 wherein said step (a) further includes providing an installation tool having reference indicia provided on both of the first and second members.

6. The method defined in claim 5 wherein the reference indicia includes lines formed on the first and second members.

7. The method defined in claim 5 wherein the reference indicia includes a line formed on the first member and an opening formed through the second member.

8. The method defined in claim 1 wherein said step (b) further includes (1) providing an installation tool having reference indicia provided on one of the first and second members, and (2) mounting the mounting surfaces of the installation tool on the first and second driveshaft sections of the driveshaft assembly.

9. The method defined in claim 8 wherein said step (c) further includes moving the first and second driveshaft sections relative to one another until the reference indicia provided on one of the first and second members is aligned with a reference mark.

10. The method defined in claim 1 wherein said step (b) further includes (1) providing an installation tool having reference indicia provided on both of the first and second members, and (2) mounting the mounting surfaces of the installation tool on the first and second driveshaft sections of the driveshaft assembly.

11. The method defined in claim 10 wherein said step (c) further includes moving the first and second driveshaft sections relative to one another until the reference indicia provided on the first and second members are aligned with one another.

* * * * *